United States Patent [19]
Okumura

[11] Patent Number: 5,608,304
[45] Date of Patent: Mar. 4, 1997

[54] BATTERY PROTECTION CIRCUIT AND BATTERY PACK AND APPARATUS USING THE BATTERY PACK

[75] Inventor: Masafumi Okumura, Kawasaki, Japan

[73] Assignee: Fujitsu Limited, Kanagawa, Japan

[21] Appl. No.: 511,228

[22] Filed: Aug. 4, 1995

[30] Foreign Application Priority Data

Sep. 28, 1994 [JP] Japan ................................. 6-232561

[51] Int. Cl.$^6$ ........................................................ H02J 7/00
[52] U.S. Cl. ........................... 320/5; 320/14; 320/32; 320/35
[58] Field of Search ................................. 320/5, 14, 32, 320/35, 36, 39

[56] References Cited

U.S. PATENT DOCUMENTS

| | | | |
|---|---|---|---|
| 4,727,306 | 2/1988 | Misak et al. | 320/35 |
| 5,309,080 | 5/1994 | Odendahl et al. | 320/35 |
| 5,371,456 | 12/1994 | Brainard | 320/31 |
| 5,446,364 | 8/1995 | Naskali | 320/36 X |
| 5,477,124 | 12/1995 | Tamai | 320/39 X |

*Primary Examiner*—Peter S. Wong
*Assistant Examiner*—Patrick B. Law
*Attorney, Agent, or Firm*—Nikaido, Marmelstein, Murray & Oram LLP

[57] ABSTRACT

A battery protection circuit for protecting a battery is proposed. The circuit includes a detecting circuit for detecting a battery condition and producing a detected voltage in relation to the battery condition, a comparator comparing the detected voltage with a given voltage, and a switching circuit controlling a connection between the battery and electrical elements. In the battery protection circuit, when the comparator determines that the battery needs to be protected from the battery condition, the switching circuit turns off to disconnect the battery from the electrical elements.

12 Claims, 7 Drawing Sheets

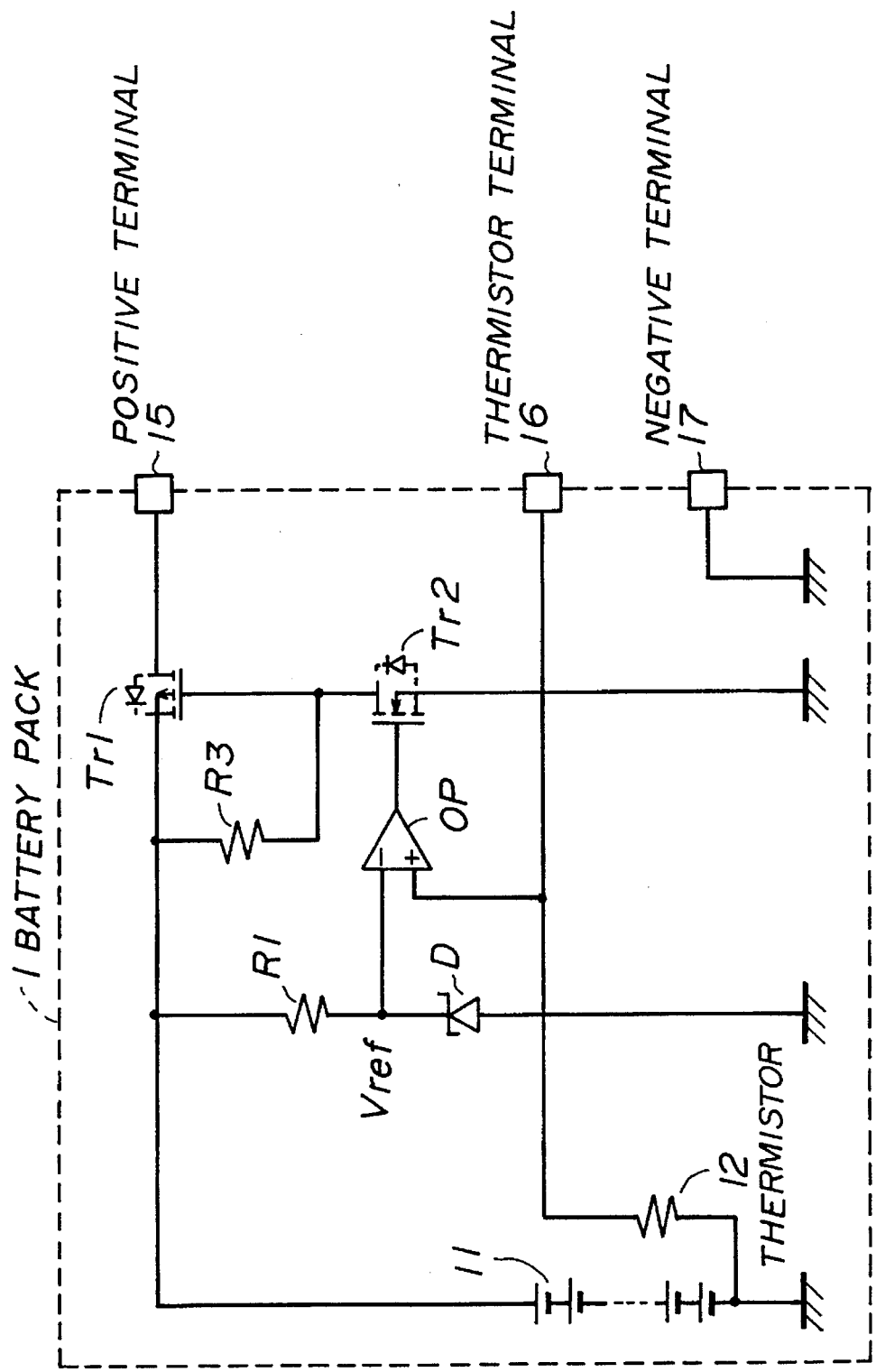

BATTERY PROTECTION CIRCUIT AND BATTERY PACK AND APPARATUS USING THE BATTERY PACK

BACKGROUND OF THE INVENTION

1. Field of the Invention

The present invention generally relates to a battery protection circuit, a battery pack and apparatus using the battery pack, and more particularly, to a battery protection circuit and a battery pack for protecting a battery in electronic devices.

Recently, a demand for portable-type electronic devices is increased. Almost all portable-type electronic devices are driven by batteries. When using dry batteries, since the dry batteries are articles for consumption and are to be changed, the dry batteries don't typically have a battery protection circuit.

However, when using secondary batteries of rechargeable batteries such as NiCd, NiH batteries, since the batteries are repeatedly used by recharging, in general, such batteries have a double or a triple protection circuit. When one such battery is charged or discharged, the battery's temperature is increased, and in a worst case, battery fluid may leak out of the battery. Therefore, a set of these batteries often has a thermal protector.

Further, since over-discharging causes degradation of battery performance, it is recommended that a discharge-stop voltage be set and an over-discharging protection mechanism be provided to the battery. In a case that a cassette-type battery pack is detachable from the apparatus, a positive terminal and a negative terminal may be short-circuited to each other, which may cause rising of the battery's temperature and the fluid leak from the battery pack.

The present invention may be useful for the protection circuits in such apparatus. The present invention is not limited to the rechargeable batteries, but is applied to the dry batteries since the protection circuit may have the same function for the dry batteries.

2. Description of the Prior Art

To use batteries such an rechargeable batteries for a long time and with safety, battery protection mechanisms such as an overheating protection mechanism, an over-discharging protection mechanism, and a short-circuit protection mechanism are required.

In the following, descriptions will be given of these mechanisms in the above order.

FIG. 1 shows an example of an apparatus including a conventional overheating protection circuit. The overheating protection circuit comprises a thermistor 41 which is accompanied with a battery 40, a thermal fuse 42, a charge controller 45, and a charging circuit 44. A power source circuit 43 converts a voltage from the battery 40 to a given source voltage Vdd to be supplied to other electrical circuits. The charge controller 45 is supplied with a voltage Vt which is produced by dividing the source voltage Vdd with a resistance R and the thermistor 41.

When a surface temperature of the battery 40 extremely rises with charging, the charge controller 45 detects the overheating and controls the charging circuit 44 to stop charging the battery 40. Further, when a trouble is caused in the charge controller 45, the charging circuit 44 may go on charging the battery 40 without stopping. Therefore, the thermal fuse 42 is disposed in series along a charging path of the battery 40 to prevent the battery 40 from exploding.

FIG. 2 shows an example of a conventional battery pack. The conventional battery pack 50 comprises, for example, a battery 51, a thermistor 52 sensing a surface temperature of the battery 50, and a fuse 53. The battery pack 50 further has a positive terminal 54 and a negative terminal 56 for charging and discharging, and a thermistor terminal 55 for detecting a temperature of the battery 51 when charging the battery 51.

The battery pack 50 is usually set in such an apparatus as shown in FIG. 1 to be used. In this case, the thermistor 52 may operate in the same way as that of the thermistor 41 shown in FIG. 1. In general, a thermal protector such as a thermal fuse (not shown in FIG. 2) is prepared within the battery pack. When the temperature exceeds 70° C., the thermal protector controls the battery pack to be at an open state. Further, in a case of charging the battery, the surface temperature of the battery being charged is always supervised by the charge controller, and when the temperature exceeds 50° C., the charge controller stops the charging circuit from charging.

Next, a description of the over-discharging protection mechanism will be discussed. In the conventional over-discharging protection mechanism, when the battery is discharged, if a voltage detection circuit detects that the battery voltage drops less than a given value, a switching circuit may shut down the discharge operation.

Next, a description of the short-circuit protection mechanism will be discussed. In the conventional short-circuit protection mechanism, the fuse 53 is coupled in series along a discharging path as shown in FIG. 2. When the short-circuit is caused, the fuse 53 is snapped to prevent overheating and an explosion. And by forming the positive and negative terminals in specific shapes (for example, a surrounding part of the terminal metal is increased in height), it may be difficult for the terminals to contact with external elements without a specific connector.

However, the above-mentioned conventional protection mechanisms have the following disadvantages.

In the conventional overheating protection mechanism, since the thermal protector having a predetermined limiting temperature is the protection mechanism for safety of the battery, an arbitrary limitation temperature may not be set to the thermal protector according to a request from the apparatus. In this method, protection is carried out only when the charge controller and peripheral circuits operate normally to control charge. When unexpected trouble is caused in the controller and the charging circuit, the protection mechanism may not operate correctly. Also, once the thermal fuse is snapped, the battery may no longer be used although the battery itself is not broken. Thus, such a mechanism may not give a sufficient protection for the battery.

In the conventional over-discharging protection mechanism, based only on the battery voltage, the battery discharging is stopped. In General, an operational voltage at which the power source circuit is operable is not always identical to the discharge-stop voltage. For example, if the operational voltage is higher than the discharge-stop voltage, discharging goes on until the battery voltage becomes the discharge-stop voltage even if the battery voltage is in a voltage region that the power source circuit is not operable. In this voltage region, discharging of the battery is unnecessary.

In the conventional short-circuit protection mechanism with the specific terminal structure, there is still a probability of the terminal being contacted. When the terminal contacts other elements, it may spark and overheat. Though the overheating of the battery may be prevented by a fuse, there is still another problem that it takes significant effort to change the fuse to replace the snapped fuse.

SUMMARY OF THE INVENTION

It is an object of this invention to provide a battery protection circuit. The battery protection circuit has a simple circuit configuration, and provides functions of an overheating protection (thermal protection), an over-discharging protection, and a short-circuit protection. The overheating protection function always ensures the battery protection regardless of a controller's state. The over-discharging protection function may set a proper discharge-stop voltage. The short-circuit protection function prevents a short circuit without a fuse. This permits the disadvantages described above to be eliminated.

The object described above is achieved by a battery protection circuit for protecting a battery, the circuit comprising: a detecting circuit for detecting a battery condition and producing a detected voltage in relation to the battery condition; a comparator comparing the detected voltage with a given voltage; and a switching circuit controlling a connection between the battery and electrical elements; wherein when the comparator determines that the battery needs to be protected from the battery condition, the switching circuit turns off to disconnect the battery from the electrical elements.

In the circuit mentioned above, the battery condition is related to at least one of a temperature of the battery, a source voltage generated from the battery and a detachment state between the battery and a battery mountable apparatus; the electrical elements include at least one of circuits for charging and discharging the battery and for supplying power from the battery; whereby: when the temperature rises over a given temperature during charging the battery, the switching circuit turns off to stop charging the battery; when the source voltage is decreased under a given source voltage during discharging the battery, the switching circuit turns off to stop discharging the battery; and when the battery is detached from the battery mountable apparatus, the switching circuit turns off to stop supplying externally the power of the battery.

The object described above is also achieved by the circuit mentioned above, wherein the detecting circuit comprises a temperature detector sensing the temperature of the battery and producing a first voltage in relation to the sensed temperature, the first voltage being the detected voltage; and wherein while the battery is being charged through the switching circuit by a charging circuit which is one of the electrical elements, when the comparator detects that the temperature of the battery rises over the given temperature by comparing the detected voltage from the temperature detector with the given voltage, the switching circuit turns off to disconnect the battery from the charging circuit based on the output of the comparator.

The object described above is also achieved by the circuit mentioned above, wherein the detecting circuit comprises a source voltage detector detecting a second voltage corresponding to the source voltage generated by a power source circuit which is one of the electrical elements, the second voltage being the detected voltage; and wherein while the battery is being discharged through the switching circuit by the power source circuit, when the comparator detects that the detected voltage from the source voltage detector drops below the given voltage, the switching circuit turns off to disconnect the battery from the power source circuit based on the output of the comparator.

The object described above is also achieved by the detecting circuit mentioned above, wherein the circuit further comprises: a detachment indicating circuit for producing a third voltage indicating detachment of the battery from the battery mountable apparatus, the third voltage being the detected voltage; and wherein an output terminal is one of the electrical elements and supplies battery power externally through the switching circuit, and when the comparator detects that the battery is detached from the battery mountable apparatus by comparing the detected voltage in the detachment indicating circuit with the given voltage, the switching circuit turns off to disconnect the battery from the output terminal based on the output of the comparator.

The object described above is also achieved by the battery protection circuit mentioned above, wherein the circuit comprises: a thermistor sensing surface temperature of the battery; and a resistance located between the thermistor and a source voltage which is generated from the battery, producing a voltage as the detected voltage by dividing the source voltage with the thermistor and the resistance; wherein while charging the battery through the switching circuit, when the surface temperature of the battery rises over a given temperature, the switching circuit turns off to stop charging the battery based on the output of the comparator, and while discharging the battery through the switching circuit, when the source voltage is decreased under a given source voltage, the switching circuit turns off to stop discharging the battery based on the output of the comparator.

The object described above is also achieved by a battery pack to be mounted in an apparatus comprising: a battery supplying power to the apparatus; a thermistor sensing a surface temperature of the battery; positive, negative and thermistor terminals for being connected to the apparatus, the thermistor terminal generating a detected voltage in relation to at least one of the surface temperature of the battery, a source voltage generated in the apparatus from the power of the battery and a detachment state between the battery pack and the apparatus; a comparator comparing the detected voltage with a given voltage; and a switching circuit controlling at least one of connections between a positive terminal of the battery and the positive terminal of the battery pack and between a negative terminal of the battery and the negative terminal of the battery pack based on an output of the comparator; wherein: when the battery pack is connected to the apparatus, if the surface temperature of the battery rises over a given temperature or the source voltage drops below a given source voltage, the switching circuit turns off; and when the battery is detached from the apparatus, the switching circuit turns off.

The object described above is also achieved by an apparatus using the battery pack mentioned above, the apparatus comprising: a voltage generating circuit for generating the detected voltage in relation to a battery condition when the battery pack is connected to the apparatus.

In the apparatus, the voltage generating circuit includes a resistance located between the source voltage generated from the power of the battery and a apparatus thermistor terminal to be connected to the thermistor terminal in the battery pack; wherein the detected voltage is generated by dividing the source voltage with the thermistor and the resistance.

The object described above is also achieved by the apparatus mentioned above, wherein the apparatus further comprises a circuit temporarily supplying a voltage larger than the given voltage to the apparatus thermistor terminal when the battery pack is connected to the apparatus.

According to the battery protection circuit, for the overheating protection function, the thermistor is in contact with the surface of the battery to measure the surface temperature of the battery. When the resistance and the thermistor are connected in series to the source voltage Vdd, a terminal voltage of the thermistor varies as the surface temperature changes. According to the terminal voltage of the thermistor, the surface temperature of the battery is measured. When the terminal voltage of the thermistor drops below the given voltage, the switching circuit turns off to disconnect the battery. Therefore, when the surface temperature of the battery rises to the given temperature, the battery may be disconnected.

According to the battery protection circuit, for the over-discharging protection function, when the voltage of the battery becomes a discharge-stop voltage, the source voltage Vdd decreases and the terminal voltage of the thermistor drops below the given voltage. And, when the terminal voltage of the thermistor drops below the given voltage, the switching circuit turns off. Therefore, when the voltage of the battery becomes the discharge-stop voltage, the battery may be disconnected.

According to the battery pack, for the shortcircuit protection function, circuits for measuring the temperature (the thermistor terminal in the battery pack and the apparatus thermistor terminal) may be disconnected between the resistance and the thermistor. When the battery pack is disconnected from the apparatus, the voltage of the thermistor terminal drops below the given voltage, and the switching circuit turns off. Therefore, even if the positive terminal and the negative terminal of the battery pack are short-circuited, there is no problem. When the battery pack is connected to the apparatus mentioned above, the voltage appears at the thermistor terminal and the switching circuit turns on.

Other objects and further features of the present invention will be apparent from the following detailed description when read in conjunction with the accompanying drawings.

BRIEF DESCRIPTION OF THE DRAWINGS

FIGS. 5A and 5B show schematic diagrams of a second embodiment of the battery protection circuit according to the present invention, FIG. 5A is a configuration of a battery pack and FIG. 5B is an apparatus to which the battery pack is connected.

DESCRIPTION OF THE PREFERRED EMBODIMENTS

Figure 1:
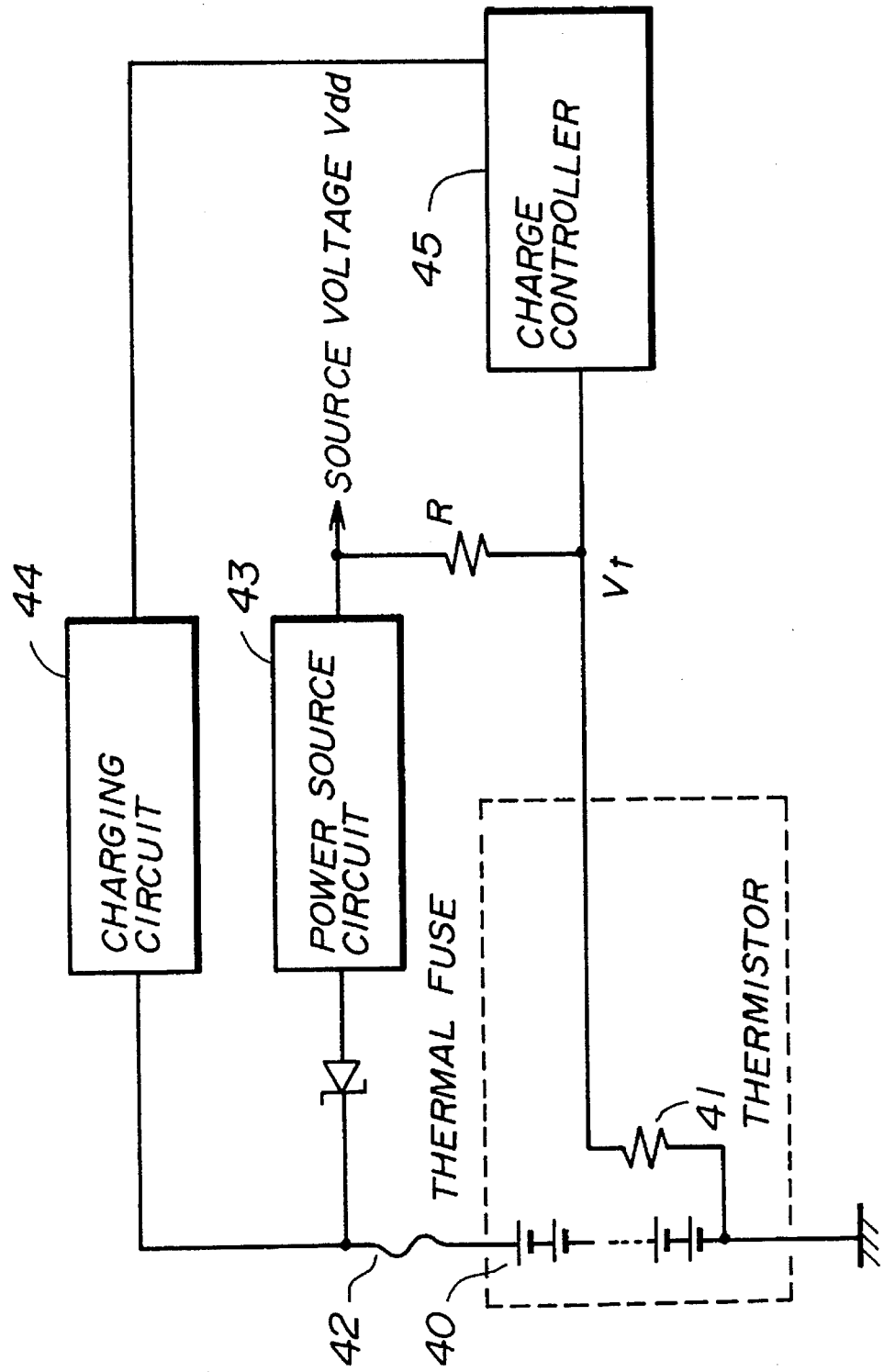
FIG. 1 shows an example of an apparatus including a conventional overheating protection circuit.
Figure 2:
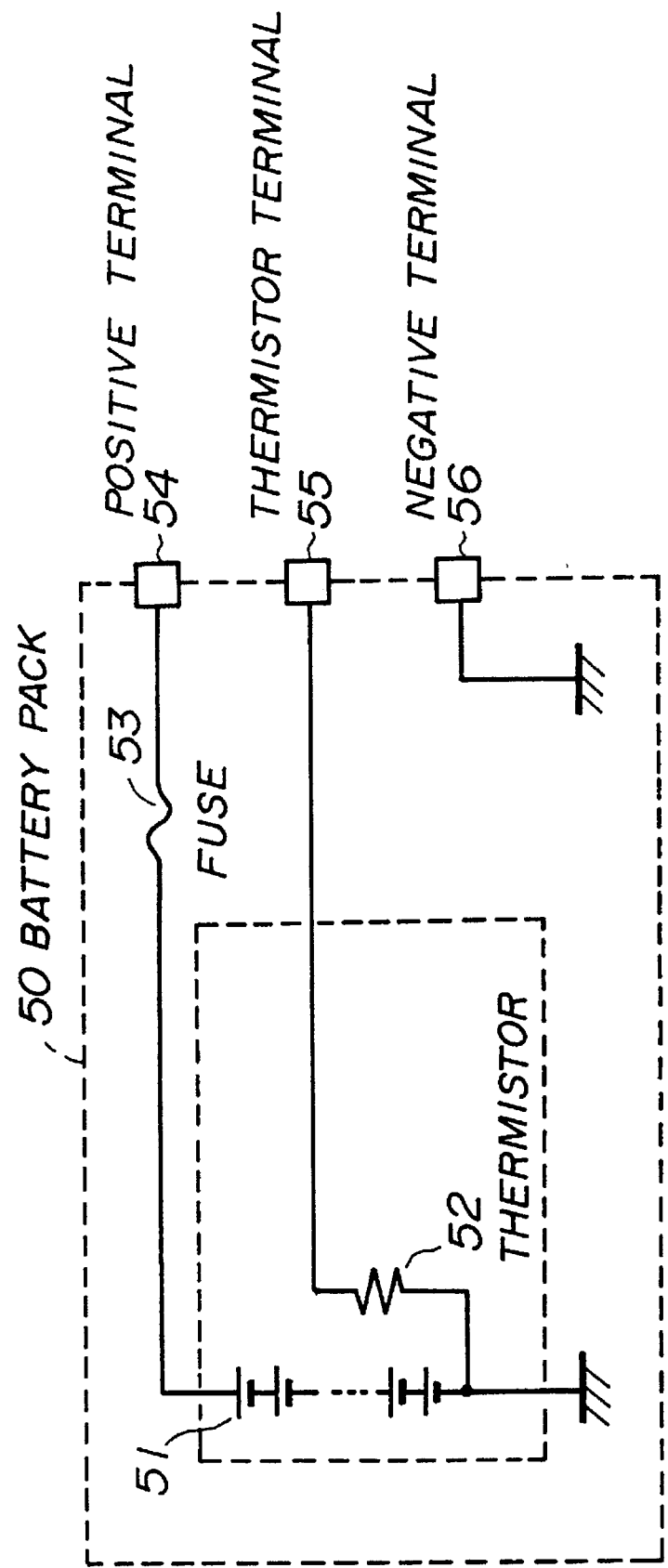
FIG. 2 shows an example of a conventional battery pack.
Figure 3:
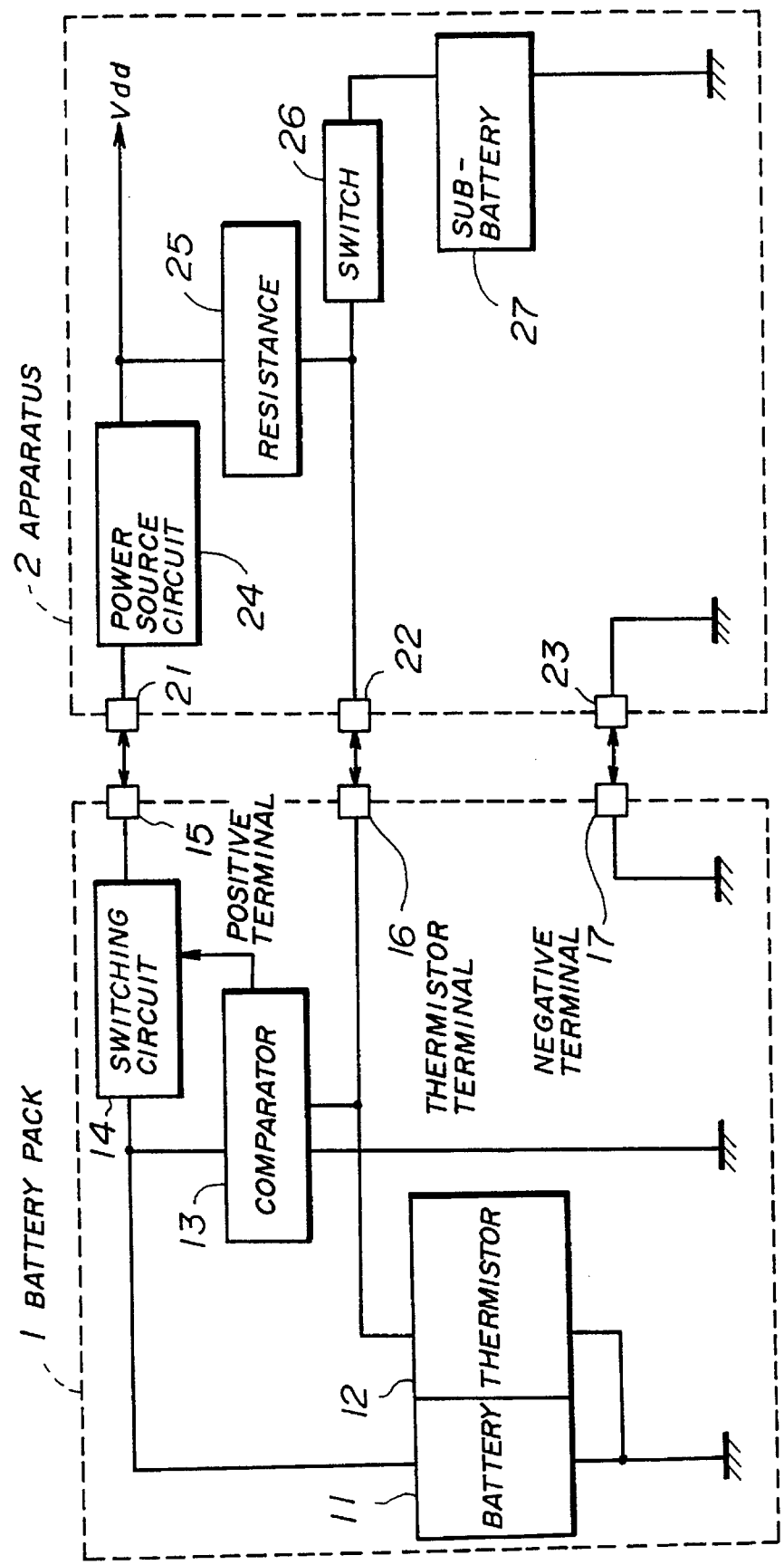
FIG. 3 shows a block diagram for explaining an operation principle of a battery protection circuit according to the present invention.

First, a description will be given of an operation principle of a battery protection circuit according to the present invention, by referring to FIG. 3. FIG. 3 shows a block diagram for explaining an operation principle of the battery protection circuit according to the present invention. A battery pack 1 is connected to an apparatus 2 which is driven by a battery.

The battery back 1 comprises a battery 11, a thermistor 12 sensing a surface temperature of the battery 11, a comparator 13 comparing a voltage across the thermistor 12 with a given voltage, and a switching circuit 14 turning on-or-off by an output of the comparator 13. The thermistor 12 is in contact with a surface of the battery 11. The battery pack 1 further has a positive terminal 15, a thermistor terminal 16, and a negative terminal 17.

The apparatus 2 comprises a power source circuit 24, a resistance 25 dividing a source voltage Vdd from the power source circuit 24, a switch 26, and a sub-battery 27. The apparatus 2 also has a positive terminal 21, a thermistor terminal 22, and a negative terminal 23.

When the battery pack 1 is connected to the apparatus 2, the source voltage Vdd is divided to a voltage by the thermistor 12 and the resistance 25. The comparator 13 compares this divided voltage with the given voltage. When the divided voltage is larger than the given voltage, the switching circuit 14 is turned on. On the other hand, when the surface temperature of the battery 11 rises up, resistivity of the thermistor 12 is decreased and the divided voltage is also decreased. When the divided voltage is dropped less than the given voltage, the switching circuit 14 is turned off to stop charging the battery 11 in the same way as a thermal protector.

In the case of discharging of the battery 11, when an output voltage of the battery 11 is decreased, the source voltage Vdd is also decreased. Therefore, the divided voltage between the thermistor 12 and the resistance 25 is decreased. When the divided voltage is dropped less than the given voltage, in the same way as mentioned above, the switching circuit 14 is turned off as an operation of the over-discharging protection.

In the configuration shown in FIG. 3, the battery pack 1 has a pack structure which is detachable. If the battery pack 1 is detached from the apparatus 2, the thermistor terminal 16 has no voltage. Therefore, the switching circuit 14 is turned off, which indicates that the battery voltage is not supplied to the positive terminal 15. This means that even if the battery pack 1 is detached from the apparatus 2, this configuration prevents the battery pack 1 from short-circuiting. On the other hand, when the battery pack 1 is connected to the apparatus 2, a voltage is generated in the thermistor terminal 16 by the source voltage Vdd or sub-battery 27. Therefore, the switching circuit 14 is turned on, and the battery 11 is electrically connected to the apparatus 2 through the positive terminals 15, 21.

When the battery pack 1 is initially connected to the apparatus 2, the battery voltage is not yet supplied to the positive terminal 15 because of the short-circuit protection function, so that the thermistor terminal 16 remains without the voltage. Therefore, in this case, the sub-battery 27 and the switch 26 temporarily supply a voltage larger than the given voltage to the thermistor terminal 16 through the thermistor terminal 22. Namely, though the source voltage Vdd is at 0 V when the battery pack 1 is detached from the apparatus 2, when the battery pack 1 is connected to the apparatus 2, the switching circuit 26 is controlled to turn on to supply the voltage from the sub-battery 27 to the thermistor terminal 16. And, thus, the switching circuit 14 in the battery pack 1 is turned on to supply the battery voltage to the apparatus 2.

Figure 4:
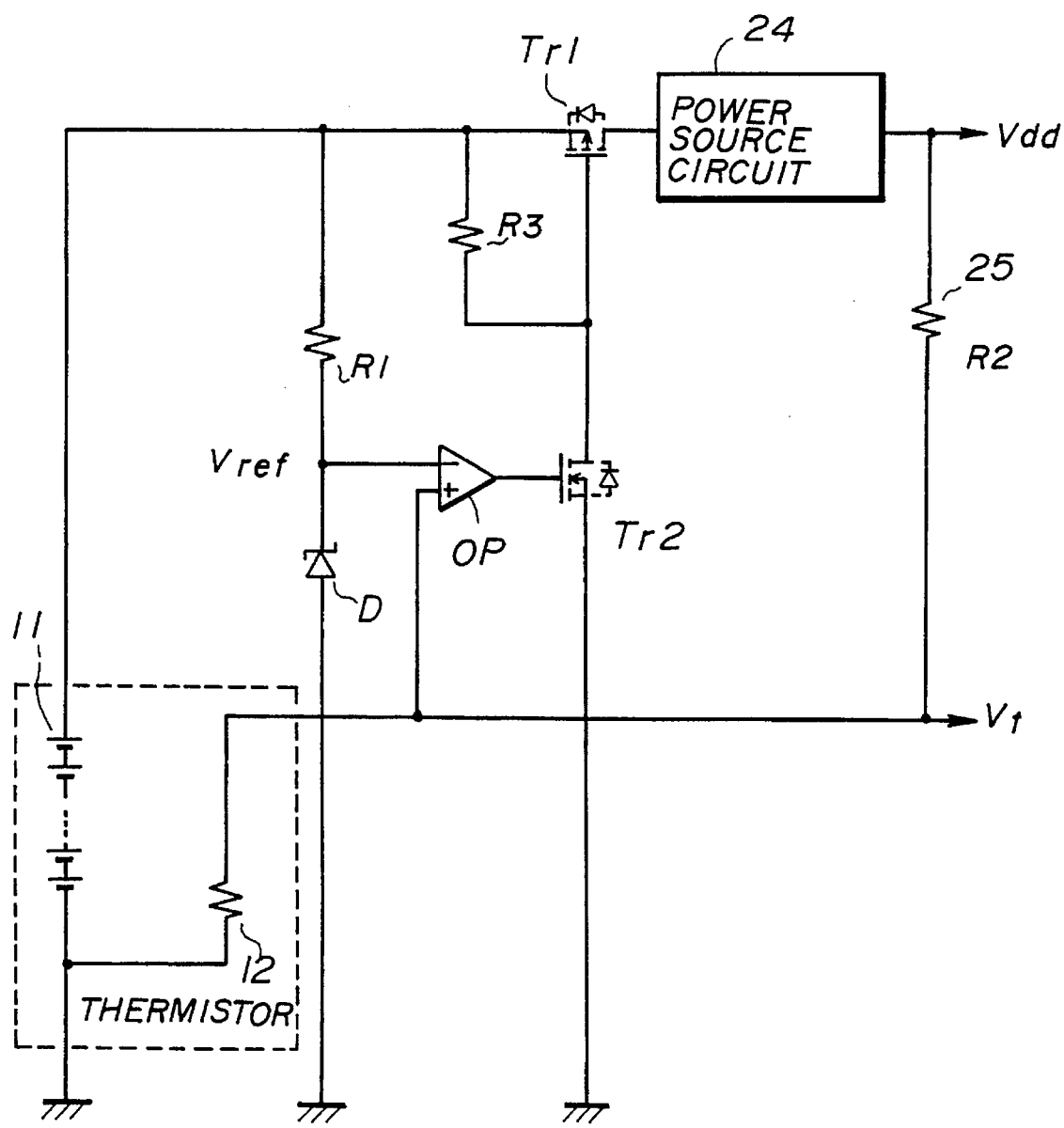
FIG. 4 shows a schematic diagram of a first embodiment of the battery protection circuit according to the present invention.

Next, a description will be given of a first embodiment of the battery protection circuit according to the present invention, by referring to FIG. 4. FIG. 4 shows a schematic diagram of the first embodiment of the battery protection circuit according to the present invention. In the battery protection circuit shown in FIG. 4, transistors Tr1, Tr2 and a resistance R3 forms the switching circuit 14 shown in FIG. 3. A resistance R1, a Zener diode D and a comparator OP form the comparator 13 shown in FIG. 3. Elements in FIG. 4 the same as those of FIG. 3 are given the same reference numerals.

At either the positive terminal or the negative terminal of the battery 11 (FIG. 4 shows a case of the positive terminal), the switching circuit including transistors Tr1, Tr2 is disposed to disconnect the battery 11 from a load (the power source circuit 24, etc.). The thermistor 12 is in close contact with a surface of the battery 11, one of terminals of the thermistor 12 being connected to the negative terminal of the battery 11, and the other of the terminals being the thermistor terminal.

The thermistor 12 has characteristics such that when the temperature rises, the resistivity of the thermistor 12 decreases. Therefore, a voltage Vt, which is generated by dividing the source voltage Vdd with the resistance (R2) 25 and the thermistor 12, varies according to the temperature. For example, when the source voltage Vdd is 3.2 V, the resistance 25 is 10 kΩ, and the resistive value of the thermistor 12 is 10 kΩ at 25° C. and 3 kΩ at 60° C., the voltage Vt is 1.6 V at 25° C. and 0.74 V at 60° C. If a reference voltage Vref as the given voltage, which is determined by the resistance R1 and the Zener diode D, is set to 0.74 V, under normal conditions, the comparator OP produces a high level H. The transistor Tr2 turns on and the transistor Tr1 turns on. Therefore, the battery 11 may be charged. When the temperature of the battery 11 rises, the resistivity in the thermistor 12 decreases, the voltage Vt drops below 0.74 V, the transistor Tr2 turns off, the transistor Tr1 turns off, and, as a result, the charging of the battery 11 is stopped.

The over-discharging protection function in the battery protection circuit shown in FIG. 4 operates as follows.

When the power source circuit 24 for generating the source voltage Vdd is constructed with a linear regulator, if an applied voltage decreases less than the source voltage Vdd, the source voltage Vdd also decreases. At the temperature of 25° C., a ratio of the resistive value of the thermistor 12 to the resistive value of the resistance (R2) 25 is 1. When the reference voltage (given voltage) Vref is set to 0.74 V, if the source voltage Vdd drops below 1.48 V, of twice voltage, the transistor Tr2 turns off and then the transistor Tr1 turns off. Therefore, discharging from the battery 11 is stopped.

Figure 5B:
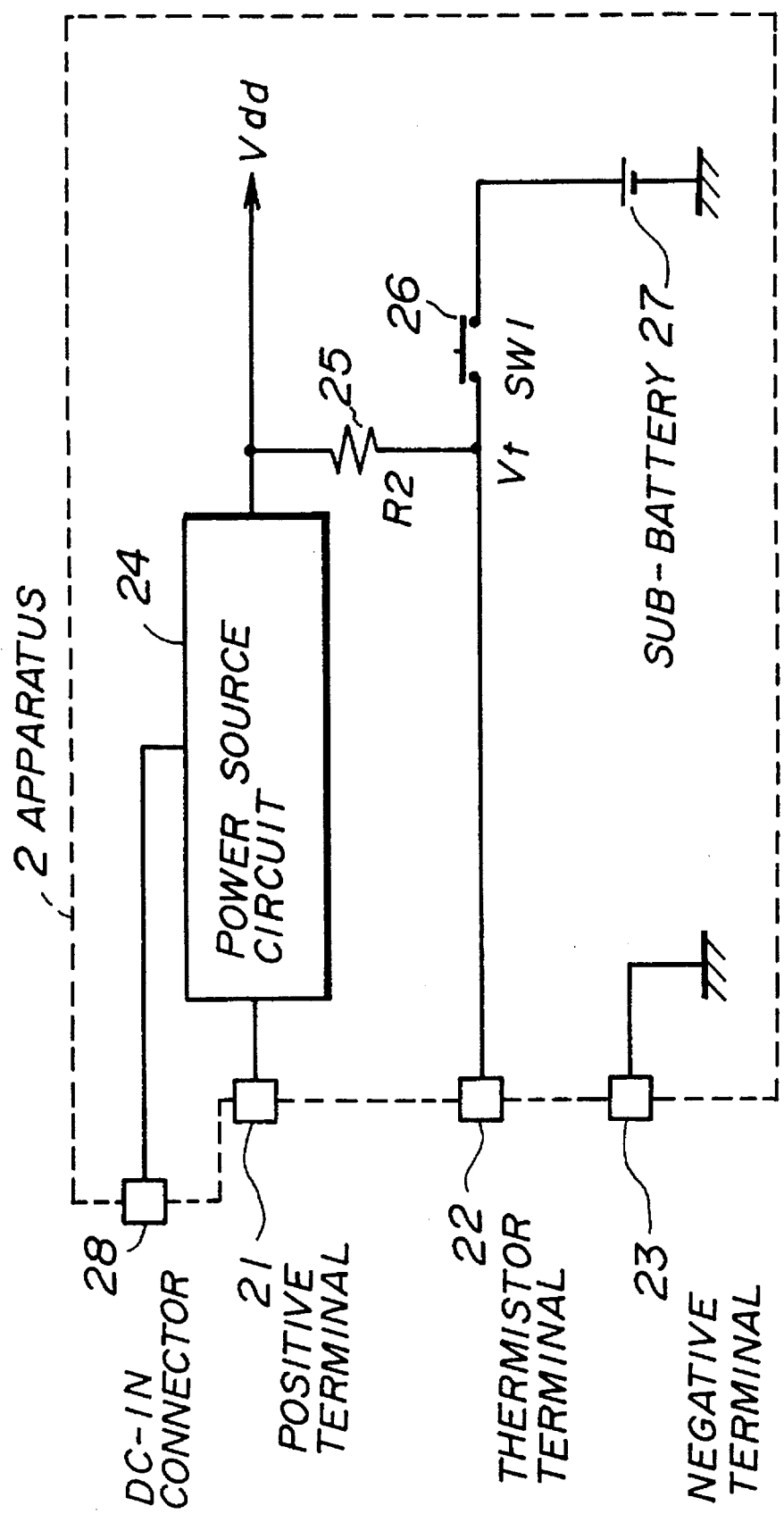

Next, a description will be given of a second embodiment of the battery protection circuit according to the present invention, by referring to FIGS. 5A and 5B. FIGS. 5A and 5B show schematic diagrams of the second embodiment of the battery protection circuit according to the present invention, FIG. 5A is a configuration of a battery pack and FIG. 5B is an apparatus to which the battery pack is connected.

In FIGS. 5A, 5B, the transistors Tr1, Tr2, the resistances R1, R2, R3, the Zener diode D, and the comparator OP have the respective same functions as those of FIG. 4. Like elements to those of FIG. 3 have the same reference numerals. In the configuration in FIGS. 5A, 5B, the battery pack 1 is connectable to the apparatus 2 through the positive terminals 15, 21, the negative terminals 17, 23, and the thermistor terminals 16, 22. The apparatus 2 further has a DC-IN connector 28 which is connected to the power source circuit 24. When the power source circuit 24 is supplied with an external power source through the DC-IN connector 28, the power source circuit 24 uses the external power source and does not use the power from the battery pack 1.

When the battery pack 1 is detached from the apparatus 2 and is alone, the thermistor terminal 16 is grounded and has no voltage. In this case, the voltage at the thermistor terminal 16 is lower than the reference voltage Vref determined by the Zener diode D. Therefore, the output of the comparator is at a low level L. Thus, the transistor Tr2 is off, and a gate voltage of the transistor Tr1 is a voltage equal to a source voltage thereof, so that the transistor Tr1 is off. Accordingly, when the battery pack 1 is detached alone, the battery voltage is not produced to the positive terminal 15. Even if the positive terminal 15 and the negative terminal 17 short-circuit, the problem such as generating sparks may not be caused. Namely, this configuration may operate as the short-circuit protection circuit.

When the battery pack 1 is connected to the apparatus 2, if the external power source is supplied to the power source circuit 24 through the DC-IN connector 28, etc., the power source circuit 24 can produce the source voltage Vdd. Therefore, in the thermistor terminal 22, the voltage Vt is generated by dividing the source voltage Vdd with the resistance (R2) 25 and the thermistor 12. If associated circuits are adjusted so that the voltage Vt may be larger than the reference voltage Vref, when connecting the battery pack 1 with the apparatus 2, the switching circuit of the transistor Tr1 turns on and the battery voltage is supplied to the positive terminals 15, 21.

If no external power source is supplied to the power source circuit 24 through the DC-IN connector 28, etc., the switch (SW1) 26 is turned on to apply the voltage of the sub-battery 27 to the thermistor terminals 22, 16. Thus, the transistor Tr1 may be turned on to electrically connect the battery 11 with the apparatus 2. In general, information apparatus such as a personal computer has a sub-battery for a memory backup, which is easily used for the sub-battery 27 in the apparatus 2.

As mentioned above, in the battery protection circuit according to the present invention, the switching circuit 14 is disposed at either the positive terminal or the negative terminal of the battery 11. And, the thermistor 12 is in close contact with the battery 11, one of the terminals of the thermistor 12 being connected to the negative terminal of the battery 11 and the other of the terminals thereof being the thermistor terminal. Based on the voltage generated at the thermistor terminal, turning on/off in the switching circuit 14 is controlled. This may produce the overheating protection function and the over-discharging protection function. Further, when the battery is constructed in the detachable pack structure, the above-mentioned battery protection circuit also makes it possible to operate as the battery short-circuit protection circuit. The battery protection circuit according to the present invention may simultaneously realize the three functions of the overheating protection, the over-discharging protection and the short-circuit protection.

Figure 6:
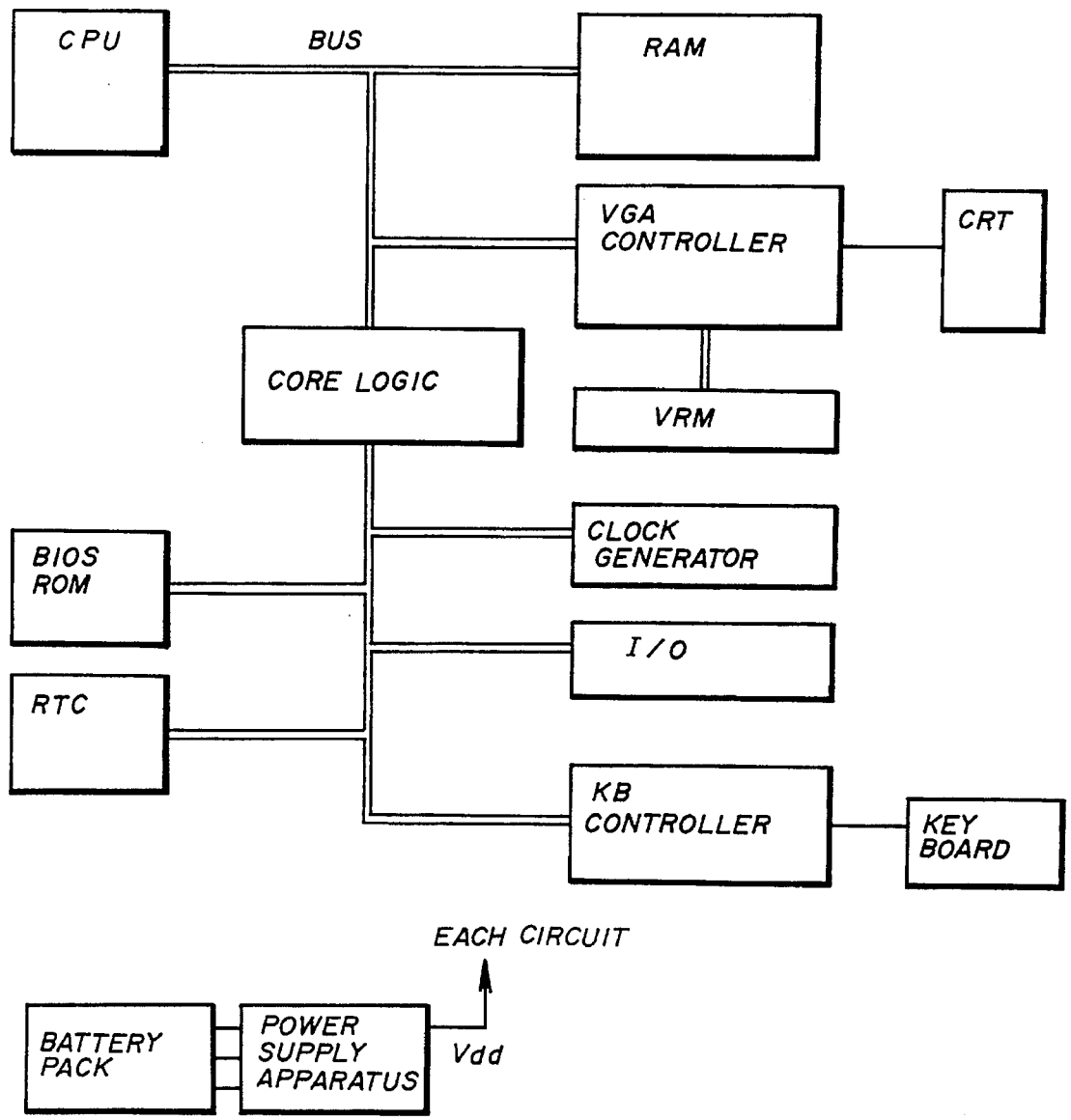
FIG. 6 shows a block diagram of a battery-driven portable computer including the battery protection circuit according to the present invention.

FIG. 6 shows a block diagram of a battery-driven portable computer including the battery protection circuit according to the present invention. The portable computer comprises a CPU, RAMs, core logic, a CRT, a keyboard, and a clock generator. The portable computer further includes a power supply apparatus with a battery pack including the above-mentioned battery protection functions. The battery pack includes a battery, a thermistor, a switching circuit, and a comparator. The battery pack further has positive, negative and thermistor terminals. The battery pack is connected to the power supply apparatus through the positive, negative and thermistor terminals.

The power supply apparatus comprises a power source circuit generating a source voltage for each circuit, a charging circuit, and a resistance generating a divided source voltage. The divided source voltage is the same as Vt shown in FIG. 5B, which may indicate the temperature of the battery, the source voltage, and the detachment state between the battery pack and the power supply apparatus. The battery is charged by the charging circuit in the power supply apparatus, the battery is discharged to the circuits in the portable computer through the power source circuit. The power supply apparatus further includes the sub-battery and the switch as shown in FIG. 5B. A backup battery for memories such as RAMs is used for the sub-battery.

As described above, the present invention has the following features.

According to the present invention, by turning on or off the charging path and the discharging path by using the thermistor for measuring the battery temperature, the battery is prevented from shortcircuiting to remove dangerous. Further, stopping the charging of the battery when the battery temperature rises up prevents the battery from breaking by such as battery fluid leak. Still further, by stopping discharging from the battery when the battery voltage decreases, it prevents the battery performance from being degraded due to the over-discharging.

Furthermore, since three kinds of protection functions are realized by one control circuit, the control circuit can be made very small in size and may be easily included into the battery pack.

Further, the present invention is not limited to these embodiments, but various variations and modifications may be made without departing from the scope of the present invention.

What is claimed is:

1. A battery protection circuit for protecting a battery, said circuit comprising:

detecting means for detecting a power source voltage produced by a power source circuit which supplies power from said battery and for producing a detected voltage in relation to said power source voltage according to the battery condition;

a comparator comparing the detected voltage with a given voltage; and a switching circuit controlling a connection between said battery and electrical elements, including said power source circuit, based upon an output of said comparator;

wherein when the comparator determines from the battery condition that the battery needs to be protected, said switching circuit disconnects the battery from the electrical elements.

2. The circuit as claimed in claim 1, wherein:

said battery condition is related to at least one of a temperature of the battery, a battery voltage and a detachment state between the battery and a battery mountable apparatus;

said electrical elements further include a circuit for charging the battery;

wherein:

when the temperature rises over a given temperature during charging of the battery, said switching circuit stops charging the battery;

when said power source voltage produced from the power source circuit is decreased under a given power source voltage during discharging of the battery, the switching circuit stops discharging the battery; and when the battery is detached from the battery mountable apparatus, the switching circuit stops supplying the power of the battery externally.

3. The circuit as claimed in claim 2, wherein said detecting means comprises a temperature detector sensing the temperature of the battery and producing a first voltage in relation to the sensed temperature, the first voltage being said detected voltage; and wherein while the battery is being charged through the switching circuit by a charging circuit which is one of said electrical elements, when the comparator detects that the temperature of the battery rises over the given temperature by comparing the detected voltage from the temperature detector with the given voltage, said switching circuit disconnects the battery from the charging circuit based on the output of said comparator.

4. The circuit as claimed in claim 3, wherein said temperature detector comprises a thermistor sensing the temperature of the battery and a resistance, the thermistor and the resistance being connected in series and being applied with said power source voltage produced by the power source circuit, and said first voltage of the detected voltage is produced by dividing the power source voltage with the thermistor and the resistance.

5. The circuit as claimed in claim 2, wherein said detecting means further comprises:

detachment indicating means for producing a third voltage indicating detachment of the battery from the battery mountable apparatus, the third voltage being the detected voltage; and wherein an output terminal is one of said electrical elements and supplies battery power externally through said switching circuit, and when said comparator detects that the battery is detached from the battery mountable apparatus by comparing the detected voltage in the detachment indicating means with the given voltage, said switching circuit disconnects the battery from the output terminal based on the output of said comparator.

6. The circuit as claimed in claim 5, wherein said detachment indicating means comprises a terminal for being connected with a second prescribed voltage located in the battery mountable apparatus, and the terminal producing the third voltage in relation to the second prescribed voltage when the battery is connected to the battery mountable apparatus, the terminal producing no voltage as the third voltage when the battery is detached from the battery mountable apparatus.

7. The circuit as claimed in claim 1, wherein said circuit comprises:

a thermistor sensing surface temperature of the battery; and a resistance located between the thermistor and said power source voltage produced by the power source circuit, producing a voltage as said detected voltage by dividing the power source voltage with the thermistor and the resistance;

wherein while charging the battery through the switching circuit, when the surface temperature of the battery rises over a given temperature, said switching circuit stops charging the battery based on the output of said comparator, and while discharging the battery through the switching circuit, when the power source voltage is decreased under a given power source voltage, the switching circuit stops discharging the battery based on the output of said comparator.

8. An apparatus using a battery pack, said battery pack having:

a battery supplying power to the apparatus a thermistor sensing a surface temperature of the battery;

positive, negative and thermistor terminals for being connected to the apparatus, the thermistor terminal outputting a detected voltage;

a comparator comparing the detected voltage with a given voltage; and a switching circuit controlling at least one of connections between a positive terminal of the battery and said positive terminal of the battery pack and between a negative terminal of the battery and said negative terminal of the battery pack based on an output of the comparator;

said apparatus comprising:

a power source circuit for producing a power source voltage from said power of said battery when the battery pack is connected to the apparatus; and voltage generating means, connected between said power source voltage and said thermistor terminal, for generating the detected voltage output to said thermistor terminal in relation to said power source voltage according to at least one of the surface temperature of the battery, a battery voltage and a detachment state between the battery pack and the apparatus when the battery pack is connected to the apparatus;

wherein:

said detected voltage is generated from said power source voltage produced by said power source circuit, and is compared with said given voltage when the battery pack is connected to the apparatus; and when the battery pack is connected to the apparatus, if the surface temperature of the battery rises over a given temperature or the power source voltage drops below a given power source voltage, the switching circuit stops charging and discharging the battery; and when the battery is detached from the apparatus, the switching circuit stops supplying the power of the battery externally.

9. The apparatus as claimed in claim 8, wherein said voltage generating means include a resistance located between the power source voltage generated from said power source circuit and an apparatus thermistor terminal connected to said thermistor terminal in the battery pack, and said detected voltage is generated by dividing the power source voltage with the thermistor in the battery pack and the resistance in the apparatus.

10. The apparatus as claimed in claim 9, wherein said apparatus further comprises a circuit temporarily supplying a voltage larger than the given voltage to the apparatus thermistor terminal when the battery pack is connected to the apparatus.

11. The apparatus as claimed in claim 10, wherein said circuit comprises a sub-battery and a switch, whereby when the battery pack is connected to the apparatus, the switch is turned on to supply power of the sub-battery to the apparatus thermistor terminal.

12. A battery pack to be mounted in an apparatus having a power source circuit producing a power source voltage, said battery pack comprising:

a battery supplying power to said power source circuit to produce said power source voltage;

a thermistor sensing a surface temperature of the battery;

positive, negative and thermistor terminals for being connected to the apparatus, the thermistor terminal being coupled to said power source voltage produced by the power source circuit when said battery pack is connected to said apparatus, and outputting a detected voltage in relation to said power source voltage according to at least one of the surface temperature of the battery, a battery voltage and a detachment state between the battery pack and the apparatus;

a comparator comparing the detected voltage with a given voltage; and a switching circuit controlling at least one of connections between a positive terminal of the battery and said positive terminal of the battery pack and between a negative terminal of the battery and said negative terminal of the battery pack based on an output of the comparator;

wherein:

when the battery pack is connected to the apparatus, if the surface temperature of the battery rises over a given temperature or the power source voltage drops below a given power source voltage, the switching circuit stops charging and discharging the battery; and when the battery is detached from the apparatus, the switching circuit stops supplying the power of the battery externally.

* * * * *